United States Patent [19]
Müller

[11] Patent Number: 4,782,929
[45] Date of Patent: Nov. 8, 1988

[54] LOCKING SYNCHRONIZER FOR A GEAR TRANSMISSION OF A MOTOR VEHICLE

[75] Inventor: Robert Müller, Mönsheim, Fed. Rep. of Germany

[73] Assignee: Porsche Aktiengesellschaft, Stuttgart, Fed. Rep. of Germany

[21] Appl. No.: 38,492

[22] Filed: Apr. 15, 1987

[30] Foreign Application Priority Data

Apr. 16, 1986 [DE] Fed. Rep. of Germany ....... 3612741

[51] Int. Cl.$^4$ .............................................. F16D 23/06
[52] U.S. Cl. ...................................... 192/53 F; 74/339
[58] Field of Search ................. 192/53 E, 53 F, 53 A; 74/339

[56] References Cited

U.S. PATENT DOCUMENTS

| | | | |
|---|---|---|---|
| 3,035,674 | 5/1962 | Péras . | |
| 3,175,412 | 3/1965 | Péras | 192/53 F X |
| 3,779,352 | 12/1973 | Wörner | 192/53 F |
| 3,795,293 | 3/1974 | Worner | 192/53 F |
| 4,270,639 | 6/1981 | Johnsson | 192/53 F |
| 4,376,475 | 3/1983 | Janiszewski | 192/53 F |

FOREIGN PATENT DOCUMENTS

| | | |
|---|---|---|
| 0100025 | 2/1984 | European Pat. Off. . |
| 2059218 | 6/1972 | Fed. Rep. of Germany . |
| 2523953 | 12/1976 | Fed. Rep. of Germany . |
| 2904063 | 8/1980 | Fed. Rep. of Germany . |

*Primary Examiner*—Leslie A. Braun
*Assistant Examiner*—Richard M. Lorence
*Attorney, Agent, or Firm*—Barnes & Thornburg

[57] ABSTRACT

A locking synchronizer for a motor vehicle gear transmission having a shift sleeve with an inner cone that is displaceable lengthwise on a guide sleeve, a synchronizing ring with an outer cone and an annular projection with teeth mounted on the loose gear to be engaged. During synchronization and shifting, claws mounted internally on the synchronizing ring engage tooth gaps in the annular projection. The shifting motion is opposed by a snap ring which is guided radially movably in an annular groove of the annular projection and is tensioned by the conical inner circumferential surfaces of the claws.

9 Claims, 3 Drawing Sheets

LOCKING SYNCHRONIZER FOR A GEAR TRANSMISSION OF A MOTOR VEHICLE

BACKGROUND AND SUMMARY OF THE INVENTION

The present invention relates to a locking synchronizer for a gear transmission of a motor vehicle, having loose and fixed gears. The synchronizer has a shift sleeve non-rotatably mounted on a guide sleeve but axially displaceable with tensioning of a snap ring. The shift sleeve has shift teeth for engaging corresponding shift teeth on a loose gear on a conical surface directed radially inward for Cooperation with the outer cone of a synchronizing ring. The synchronizing ring is equipped with a plurality of claws distributed symmetrically around the circumference and projecting radially inward. The claws engage broad gaps between the shift teeth of the loose gear, these gaps being formed between the shift teeth of the loose gear by removing one or more teeth. The synchronizing ring is rotatable to a limited extent and the gaps between the teeth of the loose gear.

A locking synchronizer of this general type is shown in German Published Examined Patent Application No. 2 059 218. In that synchronizer, a guide sleeve is mounted on a drive shaft. A concentric inner shift toothing of a shift sleeve engages the outer toothing of the guide sleeve in such a manner that it is non-rotatably but axially displaceable relative to the guide sleeve. When shifted lengthwise the shift toothing on the shift sleeve engages a corresponding shift toothing mounted on an annular projection of the loose gear to be engaged. Previously, however, the loose gear is synchronized with the shift sleeve by a synchronizing ring disposed therebetween. The outer cone of the synchronizing ring is in frictional contact with the inner conical surface of the shift sleeve.

At the same time, projections on the synchronizing ring which project radially inward engage matching recesses provided in the annular projection on the loose gear. The shifting motion of the shift sleeve and the synchronizing ring is counteracted by a snap ring which is inserted in an annular groove, open toward the inside, in the extensions and abuts the inner conical circumferential surface of the annular projection under spring tension.

The disadvantage of this synchronizer is the large structural width required for the annular projection with its conical circumferential surface. In addition, after manufacturing the toothing to receive the projections, deep and precisely dimensioned recesses and pockets must be machined in the loose gear after the toothing is produced, making manufacture considerably more difficult and expensive.

An object of the present invention is to reduce the structural width of a locking synchronizer and to simplify its manufacture.

This and other objects are achieved in the present invention by providing in a locking synchronizer having a synchronizing ring equipped with a plurality of claws distributed symmetrically around the circumference and projecting radially inward, with claws having conical inner circumferential surfaces which radially tension a snap ring during a lengthwise displacement of the synchronizing ring. A feature of a preferred embodiment provides a synchronizing ring with locking surfaces on either side of the claws and delimiting of the loose gear tooth gaps by deflecting surfaces on the loose gear shift teeth so that the locking surfaces cooperate with the deflecting surfaces. A further feature of a preferred embodiment of the present invention provides that the loose gear shift teeth are formed on an annular projection of the loose gear, so that the synchronizer has an axial width equal to the annular projection.

Because the snap ring is compressed by the conically tapering inner circumferential surfaces of the claws mounted on the synchronizing ring, the conical inner circumferential surfaces on the annular projection of the loose gear can be eliminated, so that the loose gear can be made narrower. The loose gear is simpler to manufacture since only one annular groove is cut from the outside in its annular projection to guide the snap ring. In this groove, the snap ring is movable under radial spring tension with lateral play. By providing finished recesses, the need to create tooth gaps when cutting teeth is eliminated.

In order to lock the shift sleeve in its right-hand or left-hand engaged position under load and to avoid jumping out of qear, provision is made to make engagement angles $\alpha 1$ and $\alpha 2$ between their shift teeth and the outer teeth on the guide sleeve appropriately different. A locking device of this kind is described in German Pat. No. 2,523,953. It can be used especially advantageously in combination with the invention since in this way the backing for the shift teeth on the loose gear and the shift sleeve can be eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
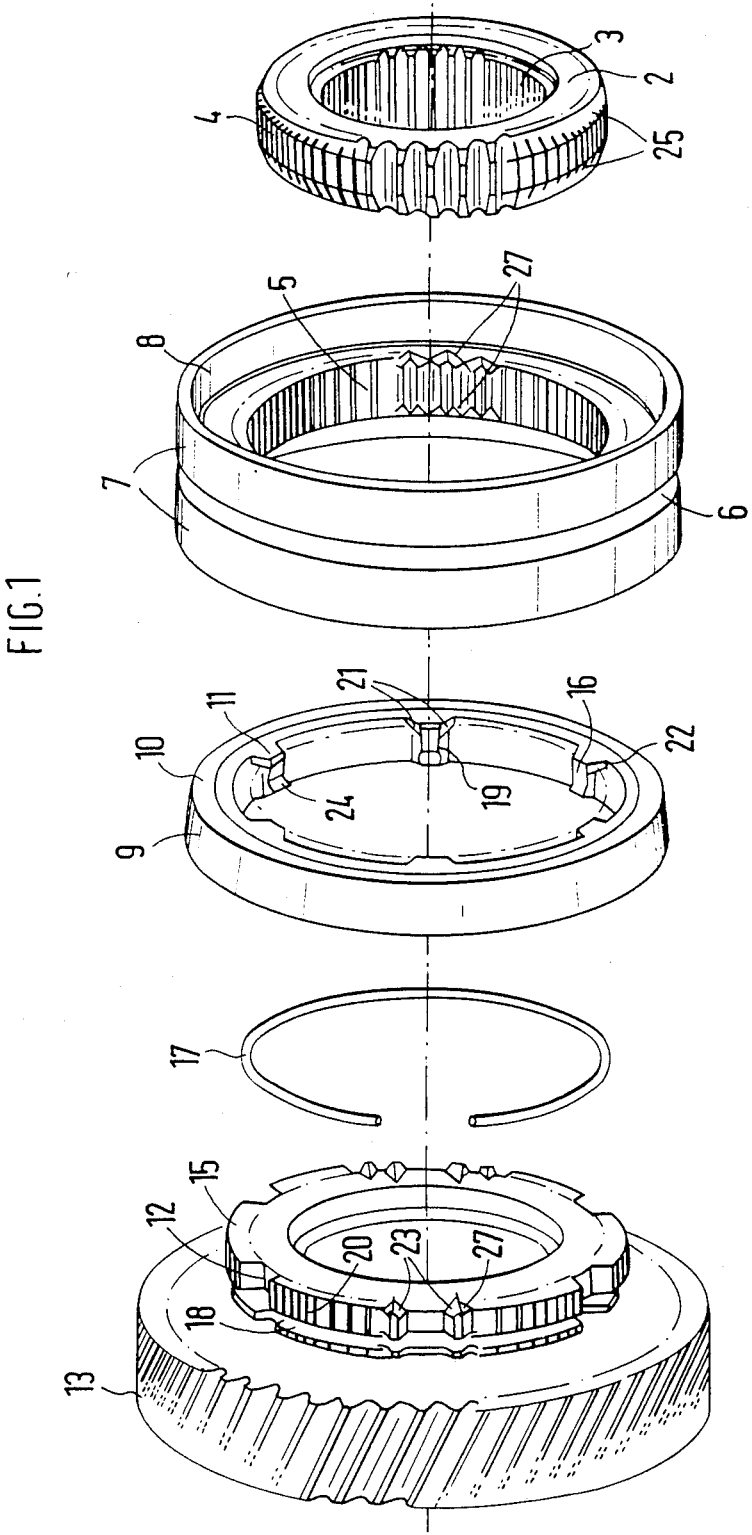
FIG. 1 is a perspective, exploded view of a locking synchronizer in accordance with a preferred embodiment of the present invention.
Figure 2:
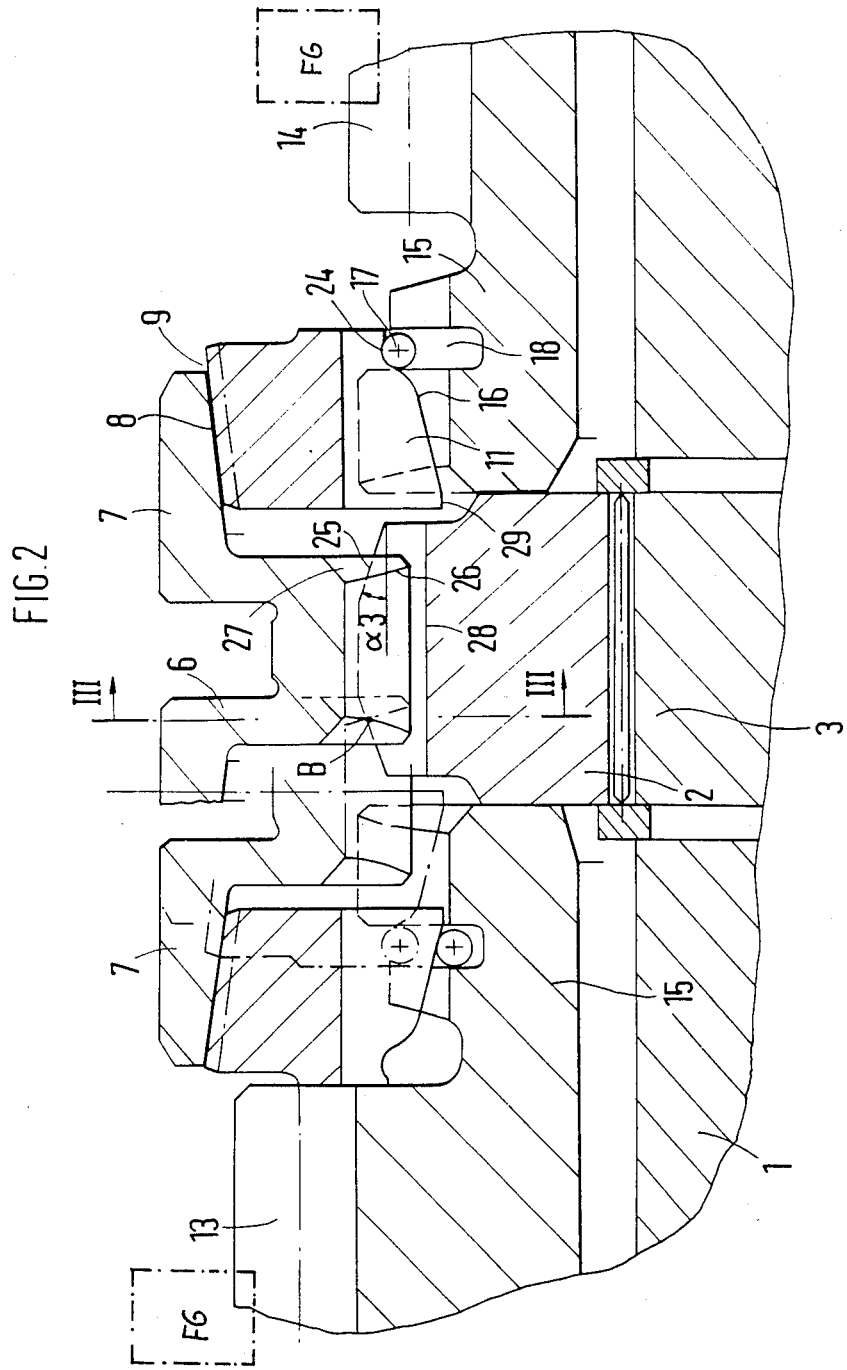
FIG. 2 is a lengthwise section through a locking synchronizer constructed in accordance with the shift sleeve in a central neutral position and in the left engaged position indicated by dashed lines.

As seen in FIGS. 1 and 2, a guide sleeve 2 is mounted non-rotatably and axially by an inner set of drive teeth 3 on a drive shaft 1 of a motor vehicle gear transmission. Guide sleeve 2 is provided externally with external teeth 4, into which an inner shift toothing 5 of a shift sleeve 6 engages. On both sides of central shift toothing 5, an annular part 7 is provided in shift sleeve 6, whose inner cone 8 cooperates by friction with the outer cone 9 of a synchronizing ring 10. The inner cone 8 and outer cone 9 cooperate as soon as shift sleeve 6 is displaced leftward or rightward axially on guide sleeve 2. On the inner circumference of synchronizer ring 10 are six symmetrically arranged claws 11 which are insertable in tooth gaps 12 of an annular projection 15 mounted on both left loose gear 13 and right loose gear 14. The loose gears 13 and 14 are drivingly engaged with respective schematically depicted fixed gears FG. The inner circumferential surfaces 16 of claws 11 taper toward shift sleeve 6, as best seen in FIG. 2. A snap ring 17 is tensioned against the claws 11. The snap ring 17 is radially movably guided in an annular groove 18, cut from the outside into the annular projection 15.

When shift sleeve 6 is moved in the direction of the left engaged position represented by the dashed lines in FIG. 2, a frictional connection is initially produced by synchronizing ring 10 via the conical surfaces 8 and 9. Synchronizing ring 10 is entrained and a narrow part 19 (FIG. 1) of its claws 11 abuts the teeth in shift toothing 20 of the annular projection as the synchronizing ring 10 rotates, and delimits tooth gaps 12. At the same time, locking surfaces 21 of claws 11, which are designed as transition zones between narrow area 19 and a wide area 22, abut the deflecting surfaces 23 of annular projection 15 of left loose gear 13. As long as no equality of rpm is reached between left loose gear 13 and shift sleeve 6, shifting of shift sleeve 6 is prevented. In this axial position of shift sleeve 6, synchronizing ring 10 is locked axially by snap ring 17, which positively engages a groove 24 formed in the inner circumferential surface 16 of claws 11.

As soon as rpm equality is reached, the locking force, acting axially between deflecting surfaces 23 and locking surfaces 21 and opposing the shifting force, decreases so that shift sleeve 6 is displaceable until it is fully engaged. For this purpose snap ring 17 is initially raised out of groove 24 and forced further and further radially over conical inner circumferential surfaces 16 of claws 11, until it reaches the left end position and the engagement of shift sleeve 6 with left loose gear 13 is complete.

Figure 3:
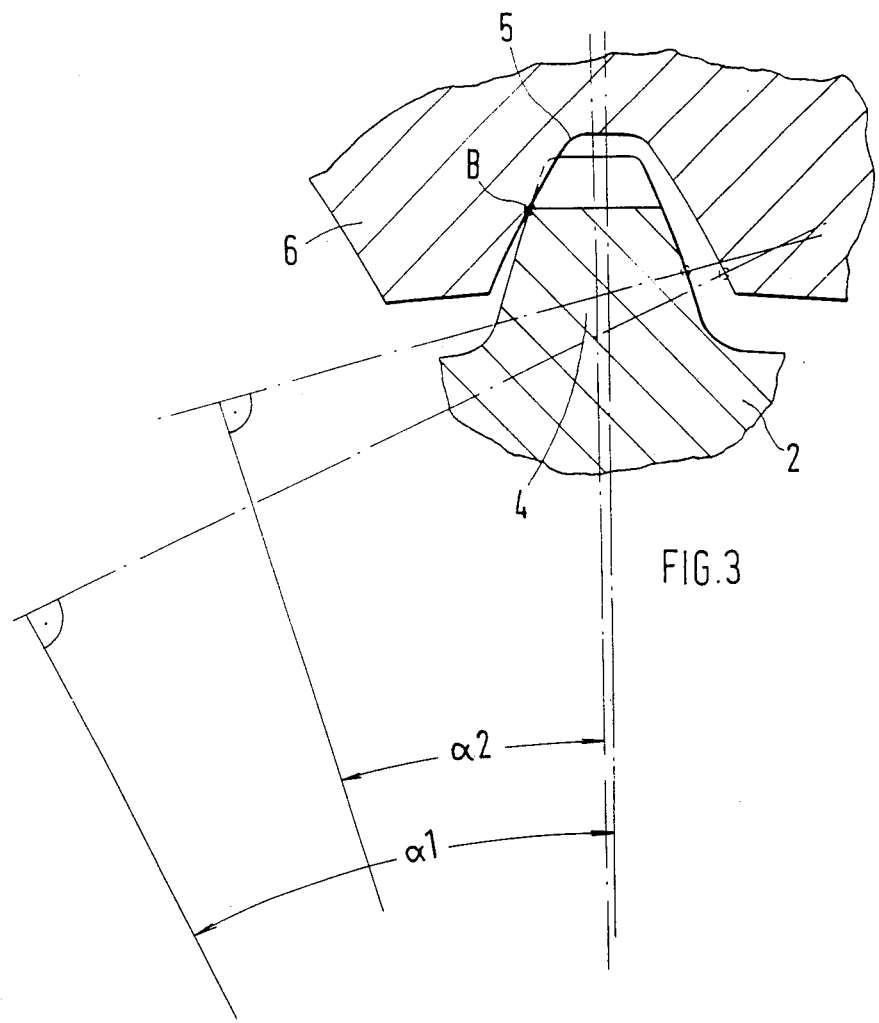
FIG. 3 shows a preferred embodiment of the engagement angle on the shift teeth and the outer teeth on the guide sleeve.

In order to keep shift sleeve 6 in this position and prevent the transmission from jumping out of gear, a locking force is exerted on shift sleeve 6 by suitable design of its shift teeth 5 and the outer teeth 4 of guide sleeve 2, this force being effective under torque load. For this purpose as shown in FIG. 3, the engagement angle α1 of shift teeth 5 of shift sleeve 6 is made larger than the engagement angle α2 of external teeth 4 of guide sleeve 2. In a preferred embodiment, α1 is approximately 15° and α2 is approximately 12°.

In addition, a bevel 25 on outer teeth 4 of guide sleeve 2, in both directions, is changed to an angle α3 approximately equal to 15°-35°. As described in detail in German Pat. No. 2,523,953, herein incorporated by reference, when the gear is engaged, a working point B is produced between the cutting edge 26 of engagement bevel 27 of shift sleeve 6 and bevel 25. In this manner, reinforcement provided by opposite bevels on the shift teeth 5 of shift sleeve 6 and annular projection 15 of left loose gear 13 is avoided, which would be costly and expensive from a manufacturing standpoint.

When the gear is changed, synchronizing ring 10 is pushed back with radially pretensioned snap ring 17 into its original position. To delimit the axial return of synchronizing ring 10, the base circle diameter 28 of outer teeth 4 of guide sleeve 2 is made larger than the smallest diameter 29 which delimits claws 11 on the inside.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A locking synchronizer for a gear transmission of a motor vehicle, having loose and fixed gears, with shift sleeve means that are non-rotatably mounted on guide sleeve means and axially displaceable with tensioning of snap ring means, said shift sleeve means having shift teeth for engaging corresponding shift teeth on a loose gear and a conical surface directed radially inward for cooperation with an outer cone of a synchronizing ring means, said synchronizing ring means being equipped with a plurality of claws, distributed symmetrically around the inner circumference of the synchronizing ring means and projecting radially inward, said claws being engageable with broad gaps between said shift teeth of the loose gear, said synchronizing ring means being rotatable to a limited extent in said gaps between said loose gear shift teeth, wherein:
   said claws of said synchronizing ring means have conical inner circumferential surfaces for radially tensioning the snap ring means during a lengthwise displacement of said synchronizing ring means, and
   wherein said snap ring means is guided in radially outwardly open annular groove means in the loose gear for movement only in a radial direction while preventing axial movement of said snap ring means.

2. The synchronizer of claim 1, wherein said synchronizing ring means has locking surfaces on both side of said claws, and said loose gear tooth gaps are delimited by deflecting surfaces on said loose gear shift teeth that are sloped such that said locking surfaces cooperate with said deflecting surfaces.

3. The synchronizer of claim 2, wherein said loose gear shift teeth are formed on an annular projection of said loose gear, and said synchronizer ring means has an axial width substantially equal to said annular projection.

4. A locking synchronizer according to claim 3, wherein said guide sleeve means has external teeth that are beveled on both sides, said shift sleeve means shift teeth and said external teeth having respective different-engagement angles therebetween for axially locking said shift sleeve means in respective left and right engagement positions under momentary load.

5. A locking synchronizer according to claim 3, wherein said claws are staggered with respect to one another in axial direction and have a narrower area and a wider area, and said locking surfaces are provided with transition zones between said narrower area and said wider area of said claws.

6. A locking synchronizer according to claim 3, wherein a base circle diameter of said external teeth of said guide sleeve means is larger than a smallest diameter which delimits claws inside axially, such that an axial return motion of said synchronizing ring means is limited by abutment of said claws against said guide sleeve means.

7. A locking synchronizer according to claim 4, wherein respective corresponding first bevel angles of an end-mounted engagement bevel of said shift teeth of said shift sleeve means and of said loose gear are different from respective corresponding second bevel angles of said locking surfaces and said deflecting surfaces.

8. A locking synchronizer according to claim 1, wherein said snap ring means is arranged in an annular groove formed axially behind shift toothing in said loose gear with respect to the disengagement direction movement of the synchronizing ring, said snap ring means being movable radially inward, with a radial deflection of said snap ring means being limited by abutment of said claws.

9. A locking synchronizer according to claim 8, wherein an inner circumferential surface of said claws has a groove which is positively engaged by said snap ring means when said shift sleeve means is in a central neutral position.

* * * * *